(12) United States Patent  
Moyer et al.

(10) Patent No.: US 8,090,984 B2  
(45) Date of Patent: Jan. 3, 2012

(54) ERROR DETECTION AND COMMUNICATION OF AN ERROR LOCATION IN MULTI-PROCESSOR DATA PROCESSING SYSTEM HAVING PROCESSORS OPERATING IN LOCKSTEP

(75) Inventors: William C. Moyer, Dripping Springs, TX (US); Michael J. Rochford, Round Rock, TX (US); Davide M. Santo, Munich (DE)

(73) Assignee: Freescale Semiconductor, Inc., Austin, TX (US)

( * ) Notice: Subject to any disclaimer, the term of this patent is extended or adjusted under 35 U.S.C. 154(b) by 238 days.

(21) Appl. No.: 12/331,759

(22) Filed: Dec. 10, 2008

(65) Prior Publication Data

US 2010/0146335 A1   Jun. 10, 2010

(51) Int. Cl.  
*G06F 11/00* (2006.01)  
*G06F 11/16* (2006.01)

(52) U.S. Cl. .................. 714/12; 714/11; 700/78
(58) Field of Classification Search .............. 714/11, 714/12, 13; 700/78  
See application file for complete search history.

(56) References Cited

U.S. PATENT DOCUMENTS

| | | | |
|---|---|---|---|
| 3,812,468 A * | 5/1974 | Wollum et al. ............... | 714/4.4 |
| 5,136,704 A | 8/1992 | Danielsen et al. | |
| 5,835,504 A | 11/1998 | Balkin et al. | |
| 5,862,502 A | 1/1999 | Giers | |
| 5,867,511 A | 2/1999 | Arimilli et al. | |
| 5,883,904 A | 3/1999 | Arimilli et al. | |
| 5,903,717 A * | 5/1999 | Wardrop ....................... | 714/12 |
| 6,233,702 B1 * | 5/2001 | Horst et al. .................. | 714/48 |
| 6,393,582 B1 * | 5/2002 | Klecka et al. ................ | 714/11 |
| 6,625,749 B1 * | 9/2003 | Quach ........................... | 714/10 |
| 6,629,271 B1 * | 9/2003 | Lee et al. ..................... | 714/49 |
| 7,085,959 B2 | 8/2006 | Safford | |
| 7,237,144 B2 | 6/2007 | Safford et al. | |
| 7,296,181 B2 | 11/2007 | Safford et al. | |
| 7,613,948 B2 * | 11/2009 | Hillman et al. ............... | 714/11 |
| 2002/0026604 A1 | 2/2002 | Bissett et al. | |
| 2004/0006722 A1 | 1/2004 | Safford | |
| 2004/0230865 A1 * | 11/2004 | Balazich et al. ............. | 714/13 |
| 2006/0107114 A1 | 5/2006 | Michaelis et al. | |

OTHER PUBLICATIONS

PCT Application No. PCT/US2009/065896; Search Report and Written Opinion dated Jul. 12, 2010.

* cited by examiner

*Primary Examiner* — Joseph Schell  
(74) *Attorney, Agent, or Firm* — Daniel D. Hill

(57) ABSTRACT

A system and method are provided. The system comprises a first and second processor, and a cross-signaling interface. The first processor executes instructions. The second processor executes the instructions in lockstep with the first processor. The cross-signaling interface is coupled between the first and second processors and is for signaling both an unanticipated altered state a location of the unanticipated altered state in the first processor to the second processor to cause the second processor to emulate the unanticipated altered state in lockstep with the first processor. The method comprises: executing instructions in a first processor; executing the instructions in a second processor in lockstep with the first processor; detecting an error condition in the first processor; transmitting information about the error condition to the second processor; processing the error condition in the first processor; and causing the first and second processor to emulate the error condition in lockstep.

18 Claims, 8 Drawing Sheets

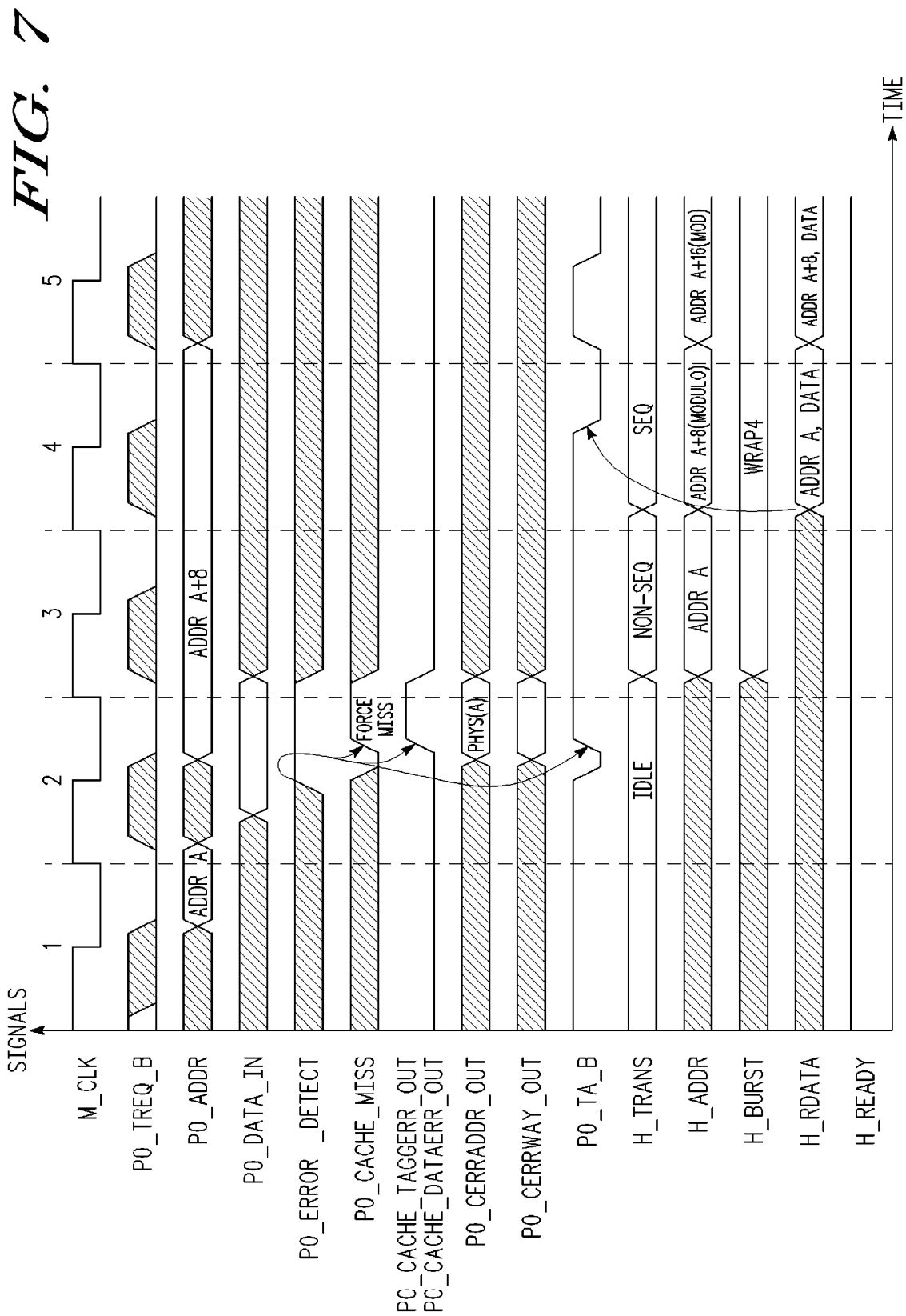

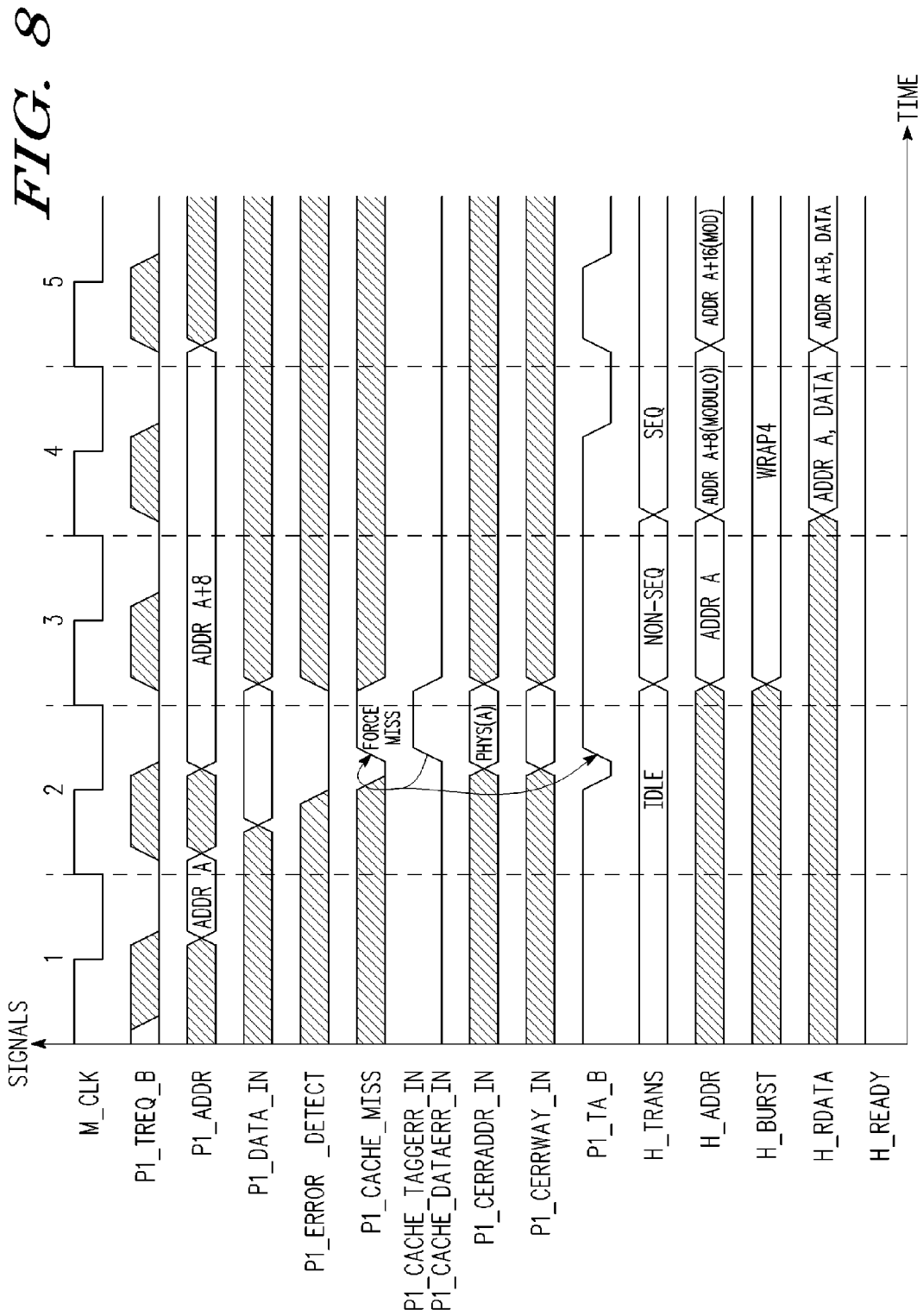

ERROR DETECTION AND COMMUNICATION OF AN ERROR LOCATION IN MULTI-PROCESSOR DATA PROCESSING SYSTEM HAVING PROCESSORS OPERATING IN LOCKSTEP

BACKGROUND

1. Field

This disclosure relates generally to data processing, and more specifically, to error detection in a multi-processor data processing system.

2. Related Art

Some applications for integrated circuit data processing systems require a higher than average level of reliability. For example, fly-by-wire, anti-lock braking, automobile airbags, and other systems where a failure can result in injury, are examples of systems that require highly reliable operation.

There are many ways to improve reliability. For example, in a memory, reliability can be improved by adding redundant components that take over when the primary components fail. In a multi-processor system, better reliability has been achieved by running multiple processors in "lockstep". When two or more processors are running in lockstep, each processor is executing the same instruction stream at the same time. To remain in lockstep, each processor, central processing unit (CPU), or core, must be exposed to the same stimulus, including for example, exception processing. Normally, this is not an issue because all of the cores are executing the same instruction stream. However, internal errors can occur in one core, such as soft errors in a cache, which are almost never duplicated in the other core(s). The actions of the cores will be different following detection of the soft error and may cause the cores to fall out of lockstep, resulting in a system failure.

Therefore, what is needed is a multi-processor system that solves the above problems.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 7 illustrates a timing diagram of various signals of FIG. 1 or FIG. 2 when one of the processors detects an internal cache error and has an auto-invalidation operation selected.

FIG. 8 illustrates a timing diagram of various signals of FIG. 1 or FIG. 2 when one of the processors receives a cache error cross-signal and has an auto-invalidation operation selected.

DETAILED DESCRIPTION

Figure 1:
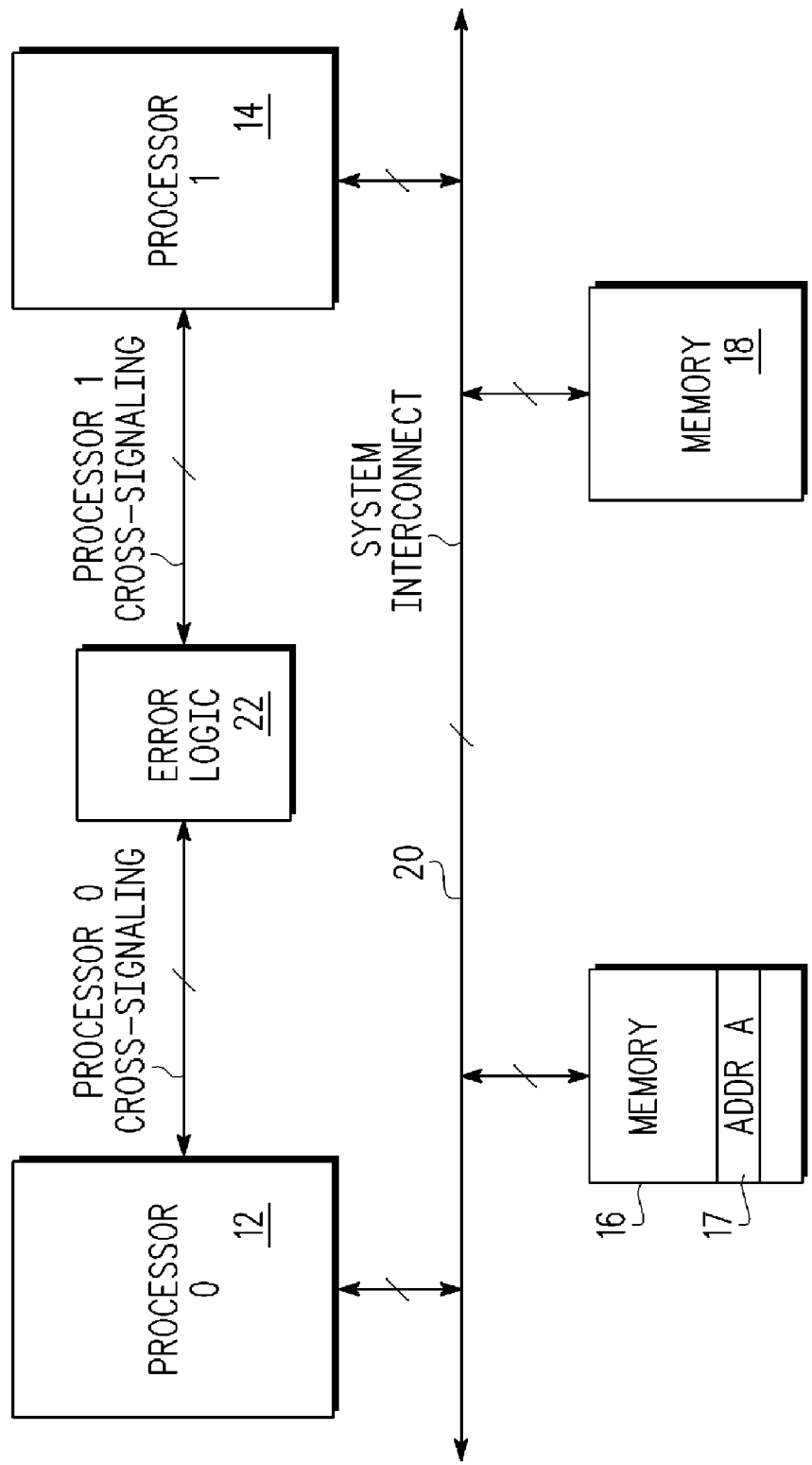
FIG. 1 illustrates, in block diagram form, a multi-processor system in accordance with an embodiment.

Generally, there is provided, a multi-core data processing system where multiple processors, cores, or CPUs, operate in a synchronized manner, such as in lockstep. When one of the cores detects an altered state due to an internally generated exception that is not based on instruction decode or instruction execution, such as for example, a soft error in a cache, the other cores are forced into the same altered state. This is accomplished by providing a cross-signaling interface coupled between the cores. The cross-signaling interface receives selected internal state information from the core experiencing the altered state, and provides the selected internal state information to the other cores so that the other cores effectively experience, or mimic, the same altered state. The internal state information is provided transparently to the system and in one embodiment includes the type of error and the location of the error to distinguish the error from among a number of different error types. In one embodiment, a machine check exception that indicates a hardware failure is generated by the core experiencing the altered state. The cross-signaling interface causes the other core(s) to generate the same machine check exception so that all of the cores are running the same machine check exception. Status and other information associated with the exception may also exchanged in one embodiment. The altered state may be due to, for example, a parity error, a decode error, logic error, and single and multi-bit errors discovered using error correction code (ECC), parity, or other error detection mechanisms. In another embodiment, instead of generating a machine check exception in response to detecting an error, the cross-signaling interface forces a cache control operation such as a "miss" condition and all of the cores initiate an auto-invalidation of the cache location and the cache location is reloaded. Also, in the event that more than one of the cores experience errors at the same time, the cross-signaling interface may include error logic that determines which error condition should be emulated by the other cores, or causes one or more cores to be reset.

Providing a cross-signaling interface in accordance with the herein described embodiments provides the benefit of preventing lockstep from being lost in a multi-core processing system when one or more of the cores experiences an altered state that is not based on instruction decode or execution, such as a soft error, thus improving reliability of the system. Also, preventing lockstep from being lost in the first place is more effective to improve system reliability than prior art systems that determine a course of action after lockstep is lost.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or the letter "B" following the signal name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

In one aspect, there is provided, a system comprising: a first processor for executing instructions; a second processor for executing the instructions in lockstep with the first processor; and a cross-signaling interface, coupled between the first and second processors, for signaling both an unanticipated altered state of the first processor and a location of the unanticipated altered state in the first processor to the second processor to cause the second processor to emulate the unanticipated altered state in lockstep with the first processor. The unanticipated altered state may be an error condition that triggers an exception in the first processor. The unanticipated altered state may be an error condition that triggers an invalidation of a location in a cache. The unanticipated altered state may be a cache TAG error in the first processor. The unanticipated altered state may be a data error in a cache associated with the first processor. Exception processing may be initiated in the first processor as a result of the unanticipated altered state, and exception processing may be forced in the second processor in lockstep with the first processor. The unanticipated altered state may also cause a cache fill operation in the first processor and a cache miss may be forced in the second processor in lockstep with the first processor. The system may further comprise error logic coupled to the first processor and the second processor, wherein if both the first and second processors experience an unanticipated altered state at the same time, the error logic for determining which unanticipated altered state should be emulated by the other processor.

In another aspect, there is provided, a method comprising: executing instructions in a first processor; executing the instructions in a second processor in lockstep with the first processor; detecting an error condition in the first processor; transmitting information about the error condition to the second processor, the information containing at least one of an error location indicator or an error type indicator for distinguishing among a plurality of types of errors; processing the error condition in the first processor; and causing the second processor to emulate the error condition in lockstep with the first processor. Processing the error condition in the first processor may further comprise initiating exception processing in the first processor. Processing the error condition in the first processor may further comprise initiating a cache control operation in the first processor. Transmitting information about the error condition to the second processor may further comprise transmitting an error type and a location of the error condition to the second processor. The error type may be one of either a cache TAG error or a cache data error. Detecting an error in the first processor may further comprise detecting a first error in the first processor and a second error in the second processor at the same time, and further comprise determining which of the first error or the second error to process.

In yet another aspect, there is provided, a method in a multi-processor data processing system, the method comprising: executing instructions in a first processor; executing the instructions in a second processor simultaneously with the first processor; detecting an error condition in the first processor; transmitting an error type and an error location regarding the error condition to the second processor; processing the error condition in the first processor; and causing the second processor to emulate the error condition simultaneously with the first processor. Processing the error condition in the first processor may further comprise initiating exception processing in the first processor. Processing the error condition in the first processor may further comprise initiating a cache miss in the first processor. The error type may be one of either a cache TAG error or a cache data error. Detecting an error in the first processor may further comprise detecting a first error in the first processor and a second error in the second processor at the same time, and further comprise determining which of the first error or the second error to process.

FIG. 1 illustrates, in block diagram form, a simplified view of a multi-processor system 10 in accordance with an embodiment. System 10 includes processor 12, processor 14, memory 16, memory 18, system interconnect 20, and error logic 22. Processor 12 includes cache control logic 21, cache 24. In the illustrated embodiment, processors 12 and 14 are substantially identical. In other embodiments, processors 12 and 14 can be different from each other. For example, processor 12 may be a general purpose processor and processor 14 may be a digital signal processor (DSP). Also, even though only two processors are shown, those skilled in the art will know that the described embodiments are also applicable to systems having more than two processors. In addition, in other embodiments, processors 12 and 14 may include different logic blocks than those depicted, or there may be additional logic blocks not illustrated in FIG. 1. Processors 12 and 14 and memories 16 and 18 are bi-directionally coupled to system interconnect 20. Note, there may be additional functional blocks coupled to system interconnect 20 that are not illustrated in FIG. 1. In one embodiment, system interconnect 20 may be characterized as a bus comprising a plurality of conductors coupled to each block of the system, such as for example, memories 16 and 18. In another embodiment, system interconnect 20 may be a conventional "cross-bar" type bus that allows simultaneous communications between system blocks. In another embodiment, system interconnect 20 may be an Advanced High-performance Bus (AHB). AHB is a bus protocol introduced in AMBA Specification version 2 published by ARM Ltd Company. In yet another embodiment, system interconnect 20 may be another type of system interconnection system.

Memories 16 and 18 can be implemented using any type of memory including, for example, static random access memory (SRAM), dynamic random access memory (DRAM), and flash. Processors 12 and 14 can access both of memories 16 and 18 to retrieve address, data, and instructions. For example, a location 17 in memory 16 can be accessed by processor 12 to update a location in cache of processors 12 or 14 with the value of a memory location at an address labeled "ADDR A". Also, the caches may be for storing instructions, address, or data, or a combination of instructions, address, or data.

Error logic 22 is bi-directionally coupled to processor 12 for sending and receiving control signals labeled "PROCESSOR 0 CROSS-SIGNALING". Also, error logic 22 is bi-directionally coupled to processor 14 for sending and receiving control signals labeled "PROCESSOR 1 CROSS-SIGNALING". Error logic 22 will be discussed further below.

Figure 2:
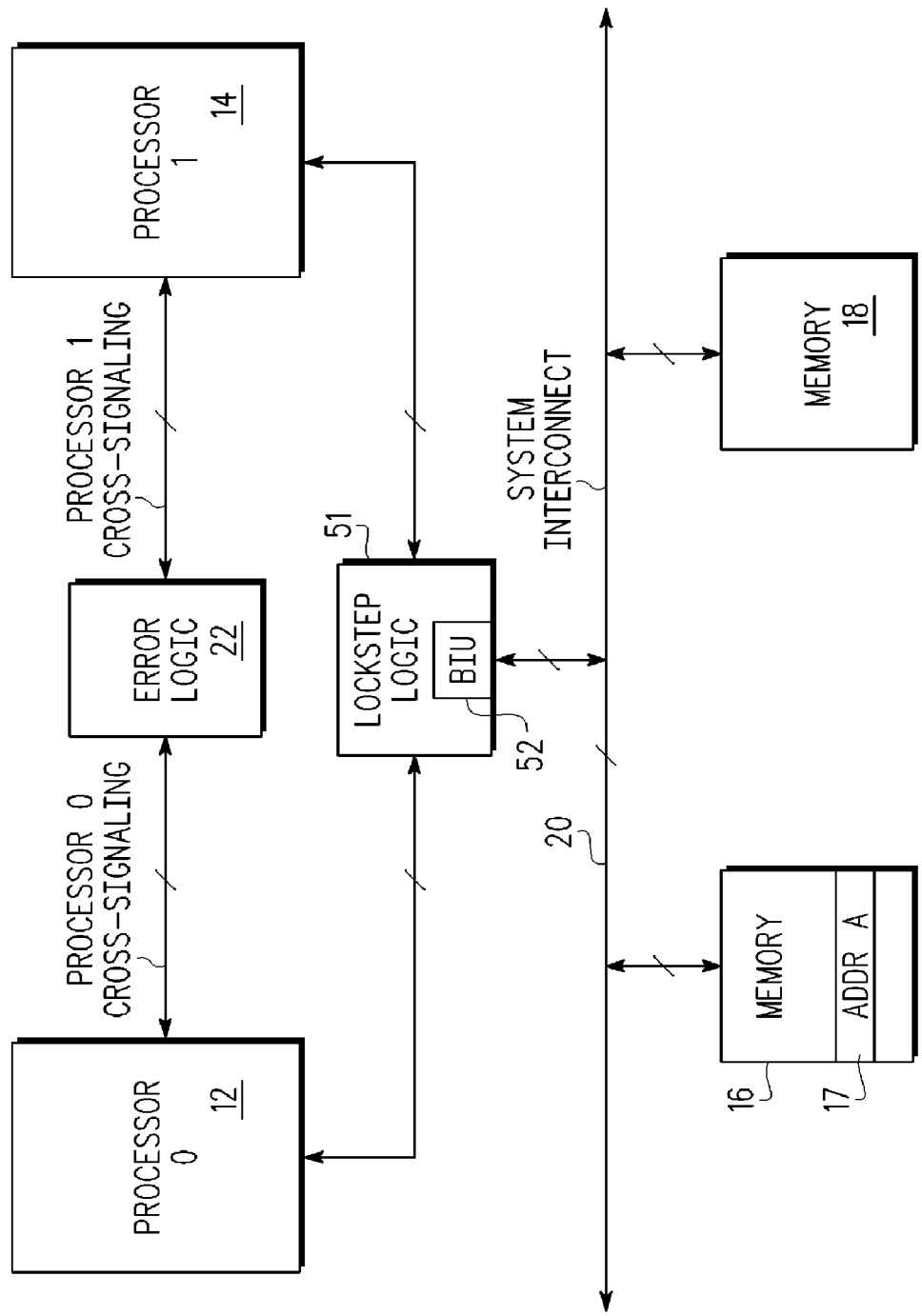
FIG. 2 illustrates, in block diagram form, a multi-processor system in accordance with another embodiment.

FIG. 2 illustrates, in block diagram form, a multi-processor system 50 in accordance with another embodiment. System 50 is the same as system 10 except that system 50 includes lockstep logic 51 coupled between both processors 12 and 14 and system interconnect 20. In the embodiment of FIG. 2, lockstep logic 51 includes a bus interface unit (BIU) 52 for coupling lockstep logic 51 to system interconnect 20. Lockstep logic 51 receives the outputs of CPUs 12 and 14 and includes a comparator to determine which CPU to couple to system interconnect 20 when system 50 is operating in lockstep mode. In one embodiment, lockstep logic 51 performs a comparison of the outputs of processor 12 and processor 14, and determines when the processors are no longer operating in lockstep, which may be an indication of a failure in one of the processors. Lockstep logic may then take appropriate action, such as coupling the non-failed processor to system interconnect 20 via BIU 52, or may respond in an alternate manner, such as signaling an exception or reset condition to one or both processors. Operation of lockstep logic 51 is well known in the art, and will not be discussed further.

Figure 3:
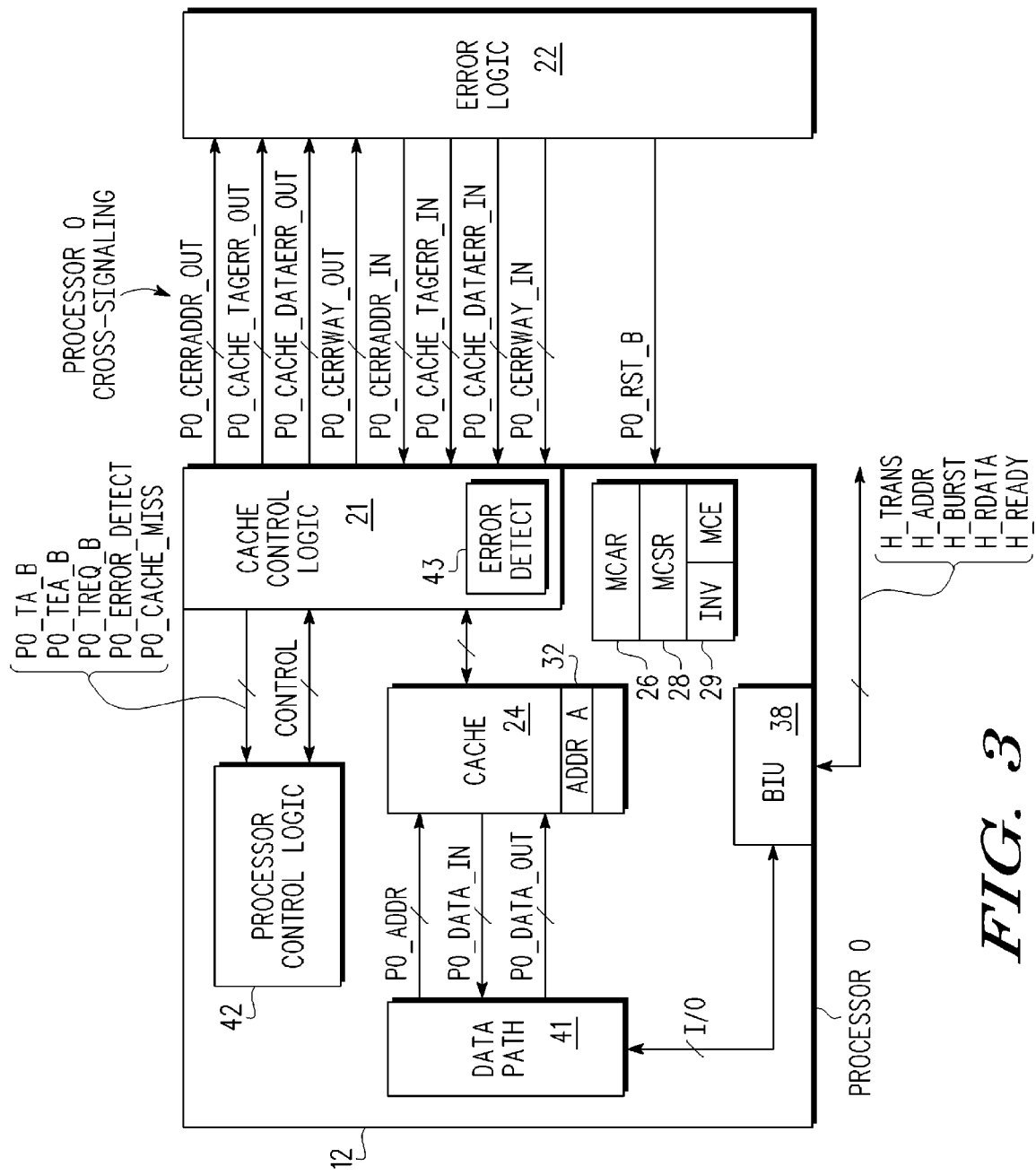
FIG. 3 illustrates, in block diagram form, a first processor of the multi-processor system of FIG. 1 or FIG. 2 in more detail.

FIG. 3 illustrates, in block diagram form, the processor 12 of the multi-processor system of FIG. 1 or FIG. 2 in more detail. In one embodiment, processor 12 may be characterized as being a central processing unit (CPU). In alternate embodiments, processor 12 may be any form of a data processor or control processor. Processor 12, labeled "PROCESSOR 0", includes cache control logic 21, cache 24, registers 26, 28, and 29, BIU 38, data path 41, and processor control logic 42. In one embodiment, cache 24 is a multi-way cache, containing a tag array for storing tag values for each of the entries in a separate data array which stores one or more portions of information in a "line" of the cache. In operation, a processor request for information is processed by performing a cache lookup operation into each way of the multi-way cache to determine if a corresponding data value is stored therein. The lookup operation is performed by comparing a lookup address (P0_ADDR) with the stored tag values in the tag array, and if a match is found for a valid entry, providing the corresponding data from the entry in the data array of the cache. In cache 24, a representative entry 32 is labeled "ADDR A", and corresponds to both the tag and data portions of the tag array and the data array. Operation of cache 24 is well known in the art and those aspects which are not affected by the invention will not be covered further. Cache control logic 21 includes error detect logic 43. In processor 12, processor control logic 42 is bi-directionally coupled to cache control logic 21 for providing and receiving control signals labeled "CONTROL" and for receiving a plurality of control signals from cache control logic labeled "P0_TA-B", "P0_TEA_B", "P0_TREQ_B", "P0_ERROR_DETECT", and P0_CACHE_MISS". Although not shown for sake of clarity, processor control logic 42 is also coupled throughout processor 0 to provide for control of the various elements within processor 12 including elements not shown which are known in the art for controlling the various aspects of internal operation of processor 12. Cache control logic 21 is bi-directionally coupled to cache 24 for sending and receiving data, address, and control signals. Cache 24 is coupled to data path 41 for receiving a plurality of signals including address signals "P0-ADDR", for providing data signals labeled "P0_DATA_IN", and for receiving data signals labeled "P0_DATA_OUT". Data path 41 is bi-directionally coupled to BIU 38 for sending and receiving signals labeled "I/O" (input/output). Various data, address, and control signals are communicated by BIU 38 for accessing memories 16 and 18 and includes, for example, signals "H_TRANS", H_ADDR", "H_BURST", "H_RDATA", and "H_READY". Cache control logic 25 provides cross-signaling interface signals to error logic 22 labeled "P0_CERRADDR_OUT", "P0_CACHE_TAGERR_OUT", P0_CACHE_DATAERR_OUT", and "P0_CERRWAY_OUT". Cache control logic 21 receives cross-signaling interface signals labeled "P0_CERRADDR_IN", "P0_CACHE_TAGERR_IN", P0_CACHE_DATAERR_IN", P0_CERRWAY_IN", and "P0_RST_B".

Figure 4:
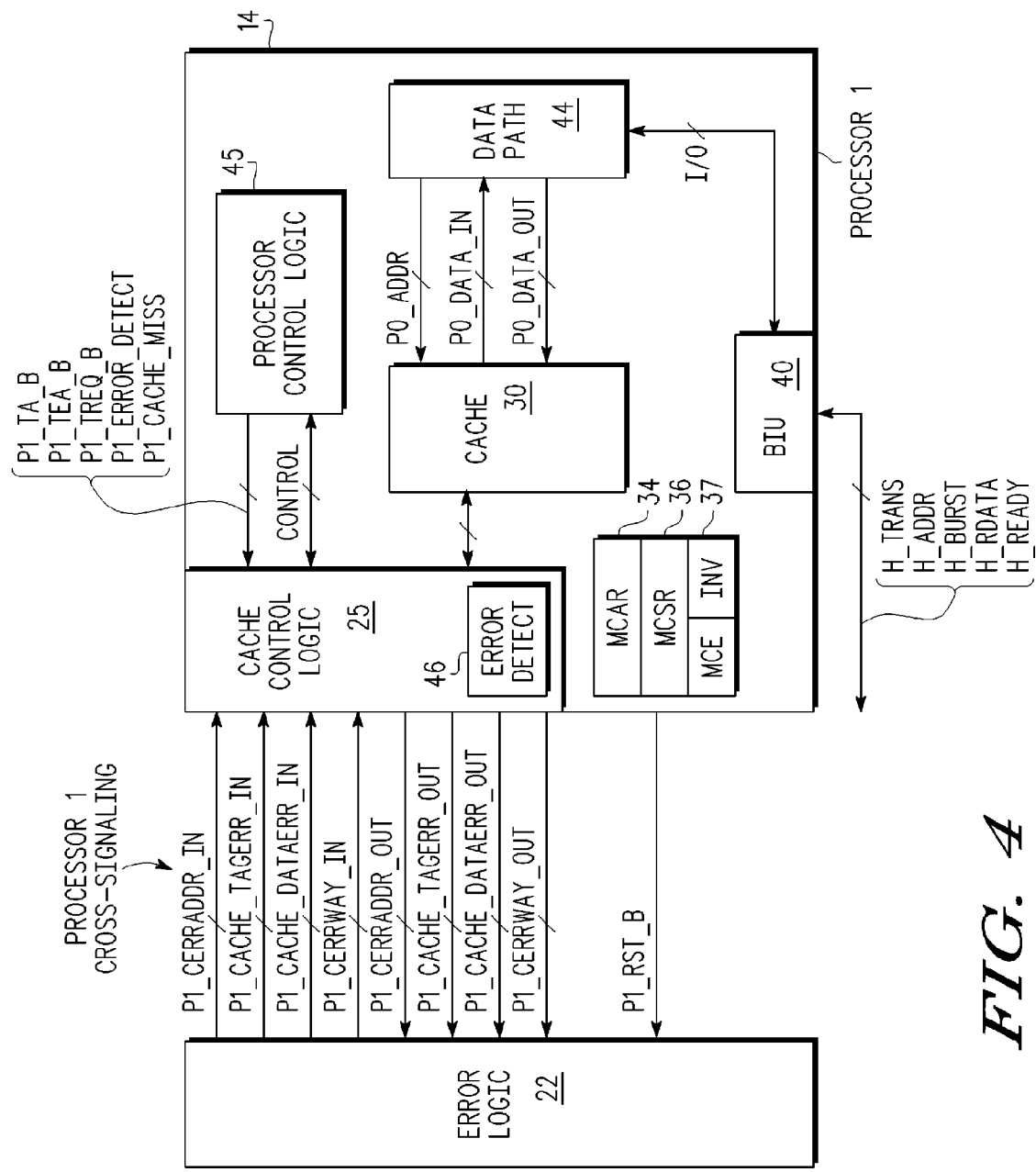
FIG. 4 illustrates, in block diagram form, a second processor of the multi-processor system of FIG. 1 or FIG. 2 in more detail.

FIG. 4 illustrates, in block diagram form, processor 14 of the multi-processor system of FIG. 1 or FIG. 2 in more detail. Processor 14, labeled "PROCESSOR 1", is substantially the same as processor 12 and includes cache control logic 25, cache 30, registers 34, 36, and 37, BIU 40, data path 44, and processor control logic 45. Cache control logic 25 includes error detect logic 46. In processor 14, processor control logic 45 is bi-directionally coupled to cache control logic 25 for providing and receiving control signal labeled "CONTROL" and for receiving a plurality of control signals from cache control logic labeled "P1_TA-B", "P1_TEA_B", "P1_TREQ_B", "P1_ERROR_DETECT", and P1_"CACHE_MISS", as well as to the other internal circuitry of processor 14. Cache control logic 25 is bi-directionally coupled to cache 30 for sending and receiving data, address, and control signals. Cache 30 is coupled to data path 44 for receiving a plurality of signals including address signals "P1-ADDR", for providing data signals labeled "P1_DATA_IN", and for receiving data signals labeled "P1_DATA_OUT". Data path 44 is bi-directionally coupled to BIU 40 for sending and receiving signals labeled "I/O". Various data, address, and control signals are communicated by BIU 40 for accessing memories 16 and 18 and includes, for example, signals "H_TRANS", H_ADDR", "H_BURST", "H_RDATA", and "H_READY". Cache control logic 21 receives cross-signaling interface signals to error logic 22 labeled "P1_CERRADDR_IN", "P1_CACHE_TAGERR_IN", "P1_CACHE_DATAERR_IN", and "P1_CERRWAY_IN". Cache control logic 21 provides cross-signaling interface signals labeled "P1_CERRADDR_OUT", "P1_CACHE_TAGERR_OUT", P1_CACHE_DATAERR_OUT", P1_CERRWAY_OUT", and "P1_RST_B". In embodiments that do not include error logic 22, the cross-signaling interface signals are coupled directly between processors 12 and 14, with the output signals of one processor coupled to the corresponding input signals of the other processor. The processors of FIG. 3 and FIG. 4 illustrate one example of processors that can be used in accordance with the described embodiment. Other embodiments can use different types of processors having different configurations. For example, each of processors 12 and 14 can be a digital signal processor (DSP).

Processors 12 and 14 include a plurality of registers such as general purpose registers and special purpose registers. Register 26 of processor 12 and register 34 of CPU 14 are labeled "MCAR" (machine check address register). Register 28 of processor 12 and register 36 of processor 14 are labeled "MCSR" (machine check state register). Registers 29 and 37 include a bit field labeled "MCE" (machine check enable) and a bit field labeled "INV" (Invalidation). The MCE bit(s) are set to enable machine check exception mode and the INV bit(s) are set to enable auto-invalidation mode. Note that for the purposes of simplicity and clarity, connections are not drawn between some of the blocks, such as for example, registers 26, 28, and 29. Also, those skilled in the art will know that there are signals in system 10 that are not illustrated in FIG. 1.

A machine check interrupt is an interrupt due to a hardware failure. When one of processors 12 and 14 takes a machine check interrupt, the corresponding one of registers 26 and 34 (MCAR) is updated to indicate the failing address associated with the machine check. The corresponding one of registers 28 and 36 is used to save the type of failure the processor experiences during the machine check interrupt. For example, the failure may be a TAG error, data error, or address error. In addition, various other machine check causes may be signaled and recorded in registers 26 and 34, corresponding to other logic within processors 12 and 14 capable of causing or reporting a machine check condition. When the INV bit(s) are set, an invalidate operation is issued when an error is detected in the cache. The invalidate operation marks the state of one or more portions of the cache as invalid without writing back any modified lines to memory. The error detection may be in response to an access to the cache by processor control logic 42 (45). In this case, when auto-invalidation is enabled by the setting of the INV bit(s), a cache miss is signaled to the processor, and a cache refill from memory 16 or 18 is initiated to replace the data in error and forward correct data to the processor, regardless of whether a cache hit actually occurred. In this manner, the correct data may be obtained for use within processor 12 (14).

The following discussion describes each of the cross-signaling interface signals provided by cache control logic 21 and cache control logic 25. In the following discussion, the letter "P" has been substituted for "P0" and "P1" since the corresponding signals have the same definition.

The signal P_CACHE_TAGERR_OUT is active as a logic high, or one (1), and is used to indicate that a valid cache tag parity error has occurred during the current cycle. It is only signaled if a cache operation or exception would be signaled by the detected error condition. This signal is reset to a logic low, or zero (0).

The signal P_CACHE_DATAERR_OUT is active as a logic one and is used to indicate a cache data out error. This signal is issued to indicate a valid cache data array parity error has occurred during the current cycle. It is only provided if a cache operation or exception would be signaled by the detected error condition. This signal is reset to a logic zero.

The signal P_CERRADDR_OUT is a 32 bit address and is active as a logic one and is the physical address corresponding to a cache error indicated by signals P_CACHE_TAGERR_OUT and P_CACHE_DATAERR_OUT. The signal P_CERRADDR_OUT includes 32 bits in the illustrated embodiment but could be a different number of bits in other embodiments. The signals are undefined following a reset operation.

The signal P_CERRWAY_OUT is a 4-bit signal in the illustrated embodiment and is active as a logic one. The number of bits of the P_CERRWAY_OUT signal depends on the number of ways in the cache. The P_CERRWAY_OUT signal is used to indicate which way or ways of the cache encountered a cache tag or data array error. This signal should be qualified with the assertion of signal P_CACHE_TAGERR_OUT or signal P_CACHE_DATAERR_OUT. This signal is reset to zero.

The signal P_CACHE_TAGERR_IN is active as a logic one and is used to indicate a cache tag parity error is being cross-signaled from another cache during the current cycle. Assertion of the P_CACHE_TAGERR_IN indicated the values of P_CERRADDR_IN and P_CERRWAY_IN should be used to cause a cache parity error to be emulated for the indicated way(s) of the cache, using the index provided by P_CERRADDR_IN. Depending on the settings of the level 1 cache control status register (corresponding to control register bits MCE and INV of register 29 (37)), either a machine check or an invalidation should occur. The register MCAR should be updated with the value on P_CERRADDR_IN if a machine check is signaled.

The signal P_CACHE_DATAERR_IN is active as a logic one and is used to indicate a cache data array parity error is being cross-signaled from another cache during the current cycle. Assertion of the P_CACHE_DATAERR_IN indicates the values of P_CERRADDR_IN and P_CERRWAY_IN should be used to cause a cache parity error to be emulated for the indicated way(s) of the cache using an index provided by P_CERRADDR_IN. Depending on the settings of the level 1 cache control status register, either a machine check or an invalidation of the cache line should occur. The register MCAR should be updated with the value of P_CERRADDR_IN if a machine check is signaled.

The signal P_CERRADDR_IN is a 32 bit address in the illustrated embodiment and is active as a logic high. The signal P_CERRADDR_IN is used to provide a physical address corresponding to a cache error to be emulated. This signal should be qualified with the assertion of signals P_CACHE_TAGERR_IN or P_CACHE_DATAERR_IN. Normally the value of P_CERRADDR_IN will be identical to the internal value of P_CERRADDR_OUT although an undetected internal error causing a loss of synchronization between two (or more) processors operating in lockstep may cause the values to be different. The loss of synchronization will be detected at some future time.

The signal P_CERRWAY_IN is active as a logic high and is a 4 bit signal in the illustrated embodiment. The P_CERRWAY_IN is used to indicate which of the corresponding ways of the cache should emulate a cache error. The P_CERRWAY_IN signal should be qualified with the assertion of signals P_CACHE_TAGERR_IN or P_CACHE_DATAERR_IN.

Processors 12 and 14 can operate in an independent operating mode and in a lockstep operating mode. When processors 12 and 14 are operating in independent operating mode, they function as separate, independent data processors. In the illustrated embodiments of FIG. 1 and FIG. 2, processors 12 and 14 are operating in lockstep mode and in one embodiment they both execute the same instructions on the same data at the same time. Because they are executing the same instructions, their outputs are expected to be the same. Therefore, if data from an address in memory is needed, it will be read from, for example, location 17 in memory 16 and provided to both processors 12 and 14 and stored in their respective cache memories at the same location and on the same clock cycle. Alternate embodiments may operate with a delay between the two processors, and the operations may not occur on the same clock cycle.

If an unanticipated altered state, such as a soft error, is detected in one the processors, the outputs of the processors would become different causing the processors to fall out of lockstep. This is because if the information retrieved from the cache has a detected error in one processor, but not in the other (a soft error occurring to the same location at the same cycle in both processors would be extremely rare), the subsequent use of the information would proceed in the processor without error, but would cause an exception processing condition within the processor which incurred the error, causing a different stream of instructions to be executed in the processors. The described embodiments prevent the processors from falling out of lockset in the event an error detected in one of the processors triggers an exception. When the error is detected, the other processors (s) are forced to emulate, or mimic the error in response to cross-signaling from the processor detecting the error. In one embodiment, the cross-signaling causes a machine check exception in all processors. In another embodiment, the cross-signaling forces a "miss" condition and all of the processors initiate an auto-invalidation of the failed cache location and the failed cache location is reloaded by all processors, even though only a single processor actually had an error condition, and the other processor(s) would have normally proceeded with a cache hit condition. In systems 10 and 50, the corrective action to be taken is selectable by a user by setting the machine check bits in the MCE bit field and the auto-invalidate bits in the INV bit field of register 29 (37).

Figure 5:
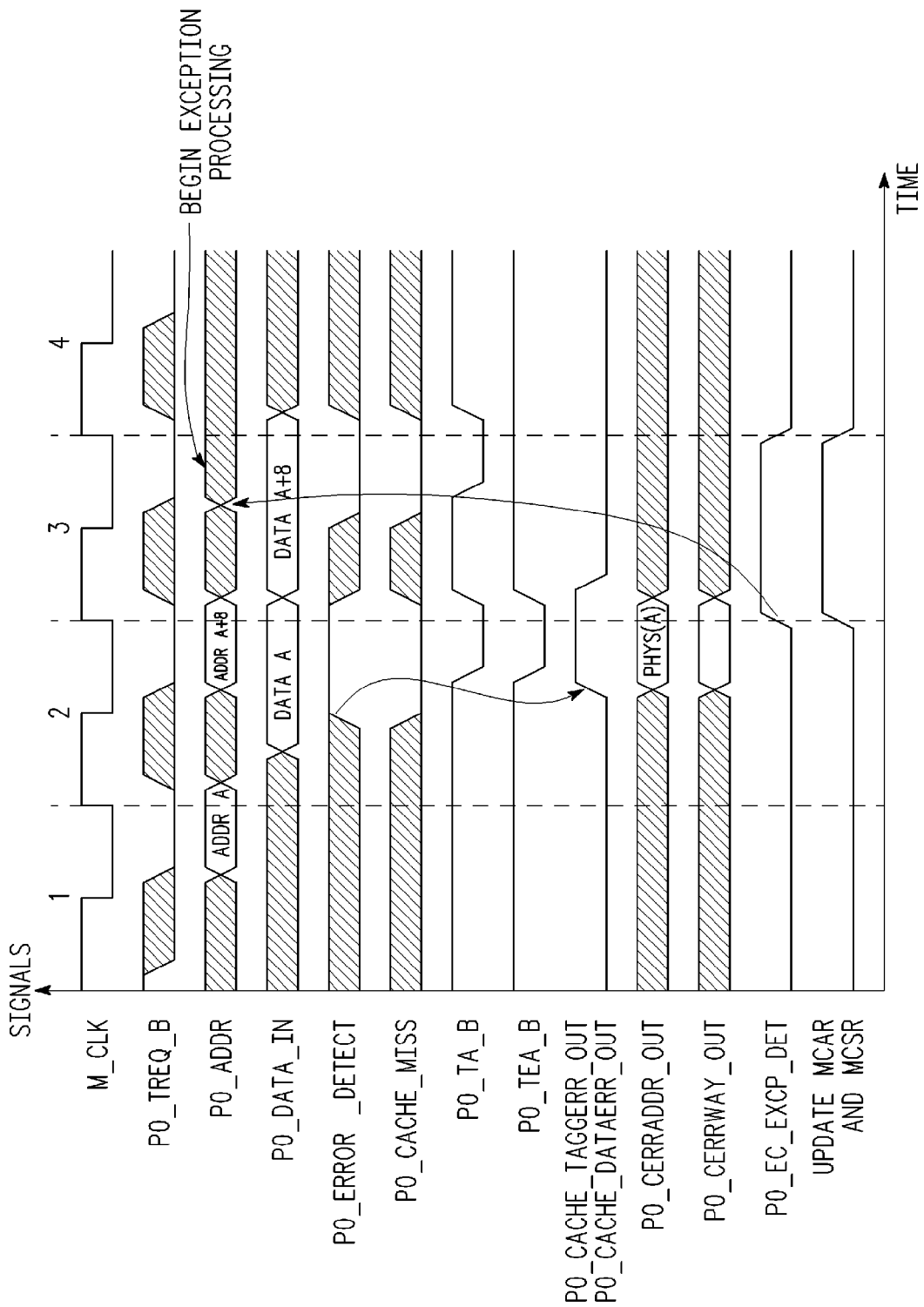
FIG. 5 illustrates a timing diagram of various signals of FIG. 1 or FIG. 2 when one of the processors detects an internal cache error and has a machine check operation selected.

FIG. 5 illustrates a timing diagram of various signals of FIG. 1 or FIG. 2 that are generated when processor 12 detects an internal cache error with a machine check operation selected.

The cache error cross-signaling interface signals are provided to allow for lockstep operation of two or more CPUs in the presence of cache errors, such as cache parity or EDC errors. Cache control logic blocks 21 and 25 provide a means for signaling that one or more errors has occurred, and that other cache(s) in the lockstep operation should emulate an error condition in lockstep. The cross-signaling provides the type of error as well as the location of the error transparently to the system. During valid cache lookups, if a parity/EDC error is detected by processor 12, the error type is indicated to other processors by means of the P0_CACHE_TAGERR_OUT and P0_CACHE_DATAERR_OUT outputs, and the corresponding address and cache way(s) incurring the error are indicated with the P0_CERRADDR_OUT and P0_CERRWAY_OUT signals. In systems 10 and 50, these output signals from processor 12 can be coupled to the corresponding P1_CACHE_TAGERR_IN, P1_CACHE_DATAERR_IN, P1_CERRADDR_IN, and P1_CERRWAY_IN inputs of processor 14. Normally, due to extremely low probability, it is not expected that the two processors would incur an error during the same lookup cycle. If this is an issue requiring detection, then error logic 22 of the systems of FIG. 1 and FIG. 2 can be utilized to detect simultaneous assertion of more than one processor's error output signals and perform appropriate error recovery, such as a reset operation by asserting P0_RST_B and P1_RST_B.

In the example of FIG. 5, instruction addresses labeled "ADDR A" and "ADDR A+8" of a plurality of addresses P0_ADDR are provided during clock cycles 1 and 2 of processor clock signal "M_CLK" to the caches in both processors 12 and 14. In the illustrated embodiment, the system clock signals are not illustrated for the purposes of simplicity and clarity. The processor clock signal M_CLK (not shown) may be generated by a source external to the processors and is then provided to each of the processors via system interconnect 20 or by other means. In another embodiment, the system clock may be generated within the system. In the embodiment illustrated in FIG. 5, each of the processors executes the same instructions at the same time and on the same data. In response to the access requests to addresses "ADDR A" and "ADDR A+8", data corresponding to "ADDR A" and "ADDR A+8" are provided from, for example, cache 30 and cache 24. The data provided is labeled "DATA A" and "DATA A+8" in FIG. 5. Error correction code (ECC) or parity checking may be used by each processor to detect errors in the stored cache tag or data values corresponding to an access address. If an error is found in the tag or data of the cache of one of the processors, for example processor 12, error detect signal P0_ERROR_DETECT is asserted as a logic high from cache control logic 21 to processor control logic 42. The error detect signal P0_ERROR_DETECT also causes a cache miss signal P0_CACHE_MISS to be negated as a logic low from cache control logic 21 to processor control logic 42, indicating a "HIT", since a machine check condition is to be taken, and no reload of cache 24 or 30 is needed. Transfer acknowledge P0_TA_B and transfer error acknowledge P0_TEA_B are both asserted in cycle 2 to signal the completion of the access request to ADDR A. In the illustrated embodiment, the transfer error acknowledge signal P0_TEA_B causes a machine check exception. Data from a memory external to processors 12 and 14, such as memory 16, is not needed to be fetched to update each processor's cache memory. One of signals P0_CACHE_TAGERR_OUT and P0_CACHE_DATAERR_OUT is transmitted from the processor experiencing the cache error to the other processor(s) in response to the P0_ERROR_DETECT signal as can be seen in FIG. 5 at clock cycle 2. Which of signals P0_CACHE_TAGERR_OUT and P0_CACHE_DATAERR_OUT is transmitted depends on the type of error detected. Signals P0_CERRADDR_OUT and P0_CERRWAY_OUT provide the address and way(s) containing the error(s) to the other processor(s), such as processor 14. An exception control, exception detected signal P0_EC_EXCP_DET is then generated at the beginning of the third clock cycle and exception processing is begun in both processors during clock cycles 3 and 4. Registers MCAR and MCSR are updated with the address and exception-type information associated with the cache error(s) detected within processor 12. In one embodiment, when a machine check operation is enabled, detected errors do not cause hardware to modify the state of the cache, but rather it is the responsibility of the machine check interrupt handler software to properly correct the cache contents, using information stored in the MCAR and MCSR control registers regarding the source and location of errors. Because exception processing in processors 12 and 14 was begun at the same time, lockstep operation is not lost, and both processors can begin exception processing for the exception. Because the state information associated with the exception processing (the address information supplied by processor 12 to processor 14 via the P0_CERRADDR_OUT signal to the P1_CERRADDR_IN signal, the type of error to be recorded (signaled via signals P0_CACHE_TAGERR_OUT and P0_CACHE_DATAERR_OUT to P1_CACHE_TAGERR_IN and P1_CACHE_DATAERR_IN, respectively), and the location(s) within the multi-way cache which encountered the error (P0_CERRWAY_OUT to P1_CERRWAY_IN) has been replicated within the processor(s) which did not incur an error, the same exception processing can take place in lockstep, and normal operation can resume at the same time after completion of exception processing. In this manner, lockstep operation is not lost when the occurrence of a soft error or other type of transient error occurs in one processor.

Figure 6:
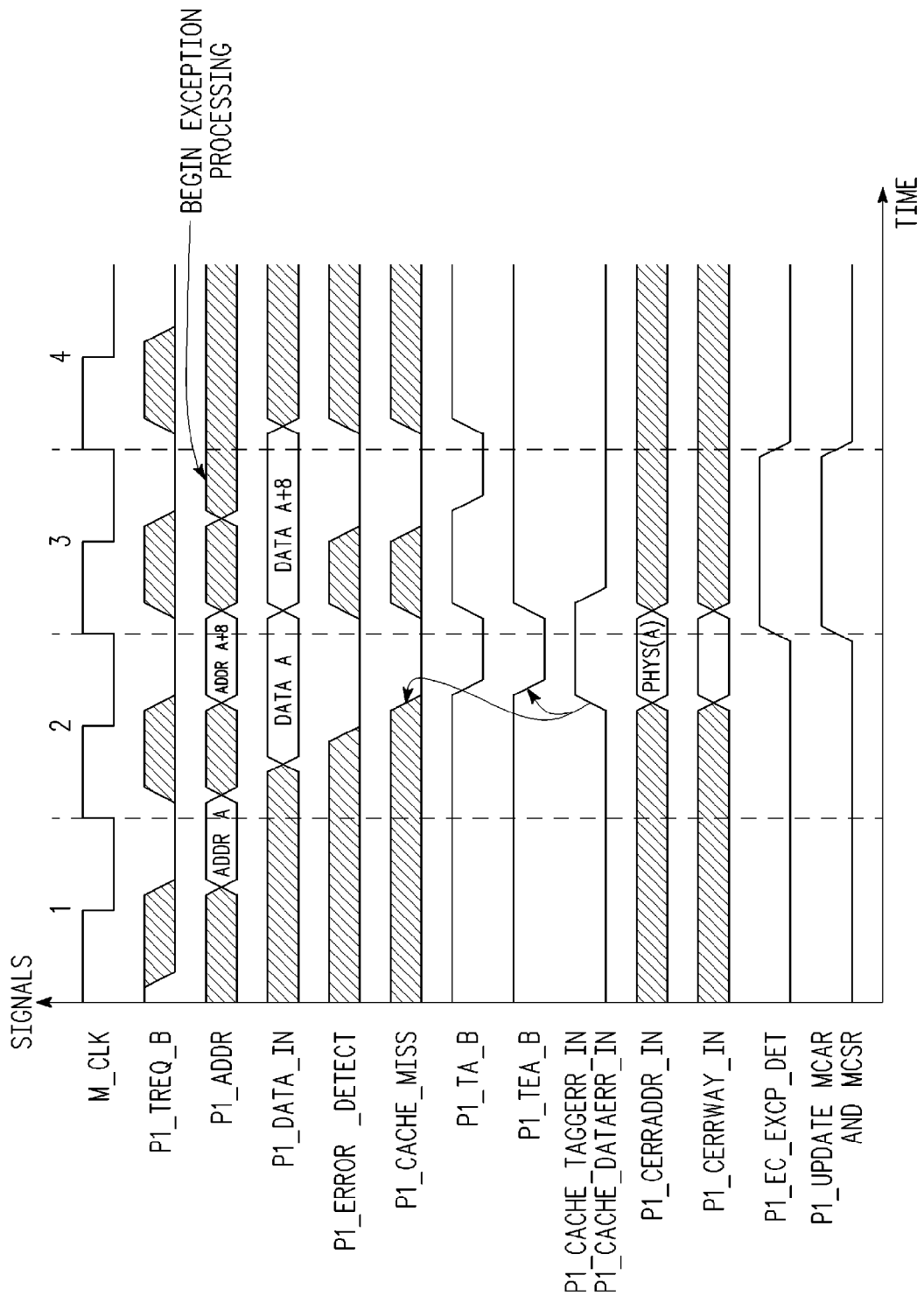
FIG. 6 illustrates a timing diagram of various signals of FIG. 1 or FIG. 2 when one of the processors receives a cache error cross-signal and has a machine check-operation selected.

FIG. 6 illustrates a timing diagram of various signals of FIG. 1 or FIG. 2 when processor 14 receives a cache error indication from processor 12 and has a machine check-operation selected. Because processors 12 and 14 are operating in lockstep, both processors are executing the same instructions at the same time and on the same data as can be seen by a comparison of FIG. 5 and FIG. 6. In FIG. 6, instruction addresses labeled "ADDR A" and "ADDR A+8" of a plurality of instruction addresses P1_ADDR are provided during clock cycles 1 and 2 of clock signal "M_CLK" to the caches in both processors 12 and 14. In response to the instruction addresses "ADDR A" and "ADDR A+8", data corresponding to "ADDR A" and "ADDR A+8" are provided from, for example, cache 30 and cache 24. The data is labeled "DATA A" and "DATA A+8" in FIG. 6. As discussed above, when an error is detected by processor 12, the type of error and location of the error are communicated to the other processors in the multi-processor system. Error signals P1_CACHE_TAGERR_IN or P1_CACHE_DATAERR_IN are received from error logic 22 and correspond to signals P0_CACHE_TAGERR_OUT and P0_CACHE_DATAERR_OUT from processor 12. Also, address and way signals P1_CERRADDR_IN and P1_CERRWAY_IN correspond to P0_CERRADDR_OUT and P0_CERRWAY_OUT, respectively. As can be seen by the negated P1_ERROR_DETECT signal, no error has been detected in processor 14. However, in response to cross-signaling interface signal P1_CACHE_TAGERR_IN or P1_CACHE_DATAERR_IN, transfer error acknowledge signal P1_TEA_B is forced asserted as a logic low to start a machine check operation just as is occurring simultaneously in processor 12. Also, the P1_TEA_B signal stops any cache miss operation by stopping signal P1_CACHE_MISS from being asserted, thus stopping a fetch operation. An exception control, exception detected signal P1_EC_EXCP_DET is then generated at the beginning of the third clock cycle and exception processing is begun in both processors during clock cycles 3 and 4. Registers MCAR and MCSR in processor 14 are updated with the address and exception information provided by the signals P1_CERRADDR_IN, P1_CERRWAY_IN, P1_CACHE_TAGERR_IN and P1_CACHE_DATAERR_IN driven by the corresponding outputs of processor 12. Because exception processing in processors 12 and 14 was begun at the same time, lockstep operation is not lost, and both processors can begin exception processing for the exception. Because the state information associated with the exception processing (the address information supplied by processor 12 to processor 14 via the P0_CERRADDR_OUT signal to the P1_CERRADDR_IN signal, the type of error to be recorded (signaled via signals P0_CACHE_TAGERR_OUT and P0_CACHE_DATAERR_OUT to P1_CACHE_TAGERR_IN and P1_CACHE_DATAERR_IN, respectively), and the location(s) within the multi-way cache which encountered the error (P0_CERRWAY_OUT to P1_CERRWAY_IN) has been replicated within the processor(s) which did not incur an error, the same exception processing can take place in lockstep, and normal operation can resume at the same time after completion of exception processing. In this manner, lockstep operation is not lost when the occurrence of a soft error or other type of transient error occurs in one processor.

FIG. 7 illustrates a timing diagram of various signals of FIG. 1 or FIG. 2 when processor 12 detects an internal cache error and has an auto-invalidation operation selected. In the example of FIG. 7, addresses labeled "ADDR A" and "ADDR A+8" of a plurality of instruction addresses P1_ADDR are provided during clock cycles 1 and 2 of processor clock signal "M_CLK" to the caches in both processors 12 and 14. In the embodiment illustrated in FIG. 7, each of the processors executes the same instructions at the same time and on the same data. In response to the access requests to addresses "ADDR A" and "ADDR A+8", data corresponding to "ADDR A" and "ADDR A+8" are provided from, for example, cache 30 and cache 24. The data is labeled "DATA A" and "DATA A=8" in FIG. 7. Error correction code (ECC) or parity may be used by each processor to detect errors in the stored cache tag or data values corresponding to an access address. If an error is found in the tag or data of the cache of one of the processors, for example processor 12, error detect signal P0_ERROR_DETECT is asserted as a logic high from cache control logic 21 to processor control logic 42. The error detect signal P0_ERROR_DETECT also causes a cache miss signal P0_CACHE_MISS to be forced to a logic high at clock cycle 2, thus causing a data fetch operation to memory external to processor 12. The error detect signal P0_ERROR_DETECT also causes one of cross-signaling signals P0_CACHE_TAGERR_OUT and P0_CACHE_DATAERR_OUT to be generated and communicated to processor 14 so that processor 14 mimics the cache miss and data fetch operation of processor 12. In addition, the P0_ERROR_DETECT signal causes transfer acknowledge P0_TA_B to be stopped, or negated as a logic high. As part of the data fetch operation bus transaction signal H_TRANS, address signal H_ADDR, transaction type signal H_BURST, read data signal H_RDATA, and transaction ready H_READY are communicated to an external memory such as memory 16 or memory 18. The letter "H" in front of the signal name indicates an AHB signal. A transfer acknowledge signal P0_TA_B is asserted as a logic low in response to the requested data being received in cycle 4. In the example of FIG. 7, a detected error has caused the auto-invalidation of the old data or tag value in the processor, and a refilling of new data from memory to occur in order to correct the error. What would have been a cache hit condition in the processor is forced into a miss condition in order to simplify the process of retrieving correct data from memory for restoring the cache contents.

FIG. 8 illustrates a timing diagram of various signals of FIG. 1 or FIG. 2 when processor 14 receives a cache error cross-signal and has an auto-invalidation operation selected. As discussed above, processors 12 and 14 are operating in lockstep, meaning that both processors are executing the same instructions at the same time and on the same data as can be seen by a comparison of FIG. 7 and FIG. 8. In FIG. 8, addresses labeled "ADDR A" and "ADDR A+8" of a plurality of instruction addresses P1_ADDR are provided during clock cycles 1 and 2 of clock signal "M_CLK" to both caches in processors 12 and 14. In response to the instruction addresses "ADDR A" and "ADDR A+8", data corresponding to "ADDR A" and "ADDR A+8" are provided from, for example, cache 30 and cache 24. The data is labeled "DATA A" and "DATA A=8" in FIG. 8. As discussed above, when an error is detected by processor 12, the type of error and location of the error are communicated to the other processors in the multi-processor system. Error signals P1_CACHE_TAGERR_IN and P1_CACHE_DATAERR_IN are received from error logic 22 and correspond to signals P0_CACHE_TAGERR_OUT and P0_CACHE_DATAERR_OUT from processor 12. Also, address and way signals P1_CERRADDR_IN and P1_CERRWAY_IN correspond to P0_CERRADDR_OUT and P0_CERRWAY_OUT, respectively. As can be seen by the logic low P1_ERROR_DETECT signal, no error has been detected in processor 14. However, in response to cross-signaling interface signal P1_CACHE_TAGERR_IN or P1_CACHE_DATAERR_IN, a cache miss is forced to occur in processor 14 by causing signal P1_CACHE_MISS to be asserted during clock cycle 2 in step with the cache miss generated in processor 12 (see FIG. 7). The cross-signaling signal P1_CACHE_TAGERR_IN or P1_CACHE_DATAERR_IN also prevents transfer acknowledge signal P1_TA_B from being asserted. The data fetch operation described above for processor 12 in FIG. 7 is mimicked by processor 14. Therefore, as part of the data fetch operation of processor 14, bus transaction signal H_TRANS, address signal H_ADDR, transaction type signal H_BURST, read data signal H_RDATA, and transaction ready H_READY are communicated to an external memory such as memory 16 or memory 18. Because cache miss processing was performed by both processors 12 and 14 at the same time, in spite of a hit condition present in processor 14, lockstep operation is not lost. Because the state information associated with the cache miss processing (the address information supplied by processor 12 to processor 14 via the P0_CERRADDR_OUT signal to the P1_CERRADDR_IN signal, and the location(s) within the multi-way cache which encountered the error (P0_CERRWAY_OUT to P1_CERRWAY_IN) has been replicated within the processor(s) which did not incur an error, the same cache processing can take place in lockstep, and normal operation can resume at the same time after completion of cache auto-invalidation processing. In this manner, lockstep operation is not lost when the occurrence of a soft error or other type of transient error occurs in one processor.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, memory 16 may be located on a same integrated circuit as processors 12 and 14 or on a separate integrated circuit or located within another peripheral or slave discretely separate from other elements of system 10. Also for example, system 10 or portions thereof may be software or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A system comprising:
   a first processor for executing instructions;
   a second processor for executing the instructions in lockstep with the first processor; and
   a cross-signaling interface, coupled between the first and second processors, for signaling both an unanticipated altered state of the first processor and a location of the unanticipated altered state in the first processor to the second processor to cause the second processor to emulate the unanticipated altered state in lockstep with the first processor.

2. The system of claim 1, wherein the unanticipated altered state is an error condition that triggers an exception in the first processor.

3. The system of claim 1, wherein the unanticipated altered state is an error condition that triggers an invalidation of a location in a cache.

4. The system of claim 1, wherein the unanticipated altered state is a cache TAG error in the first processor.

5. The system of claim 1, wherein the unanticipated altered state is a data error in a cache associated with the first processor.

6. The system of claim 1, wherein exception processing is initiated in the first processor as a result of the unanticipated altered state, and exception processing is forced in the second processor in lockstep with the first processor.

7. The system of claim 1, wherein the unanticipated altered state causes a cache fill operation in the first processor and a cache miss is forced in the second processor in lockstep with the first processor.

8. The system of claim 1, further comprising error logic coupled to the first processor and the second processor, wherein if both the first and second processors experience an unanticipated altered state at the same time, the error logic for determining which unanticipated altered state should be emulated by the other processor.

9. A method comprising:
  executing instructions in a first processor;
  executing the instructions in a second processor in lockstep with the first processor;
  detecting an error condition in the first processor;
  transmitting information about the error condition to the second processor, the information containing both an error location indicator and an error type indicator for distinguishing among a plurality of types of errors;
  processing the error condition in the first processor; and
  causing the second processor to emulate the error condition in lockstep with the first processor.

10. The method of claim 9, wherein processing the error condition in the first processor further comprises initiating exception processing in the first processor.

11. The method of claim 9, wherein processing the error condition in the first processor further comprises initiating a cache control operation in the first processor.

12. The method of claim 9, wherein the error type is one of either a cache TAG error or a cache data error.

13. The method of claim 9, wherein detecting an error in the first processor further comprises detecting a first error in the first processor and a second error in the second processor at the same time, and further comprising determining which of the first error or the second error to process.

14. In a multi-processor data processing system, a method comprising:
  executing instructions in a first processor;
  executing the instructions in a second processor simultaneously with the first processor;
  detecting an error condition in the first processor;
  transmitting an error type and an error location regarding the error condition to the second processor;
  processing the error condition in the first processor; and
  causing the second processor to emulate the error condition simultaneously with the first processor.

15. The method of claim 14, wherein processing the error condition in the first processor further comprises initiating exception processing in the first processor.

16. The method of claim 14, wherein processing the error condition in the first processor further comprises initiating a cache miss in the first processor.

17. The method of claim 14, wherein the error type is one of either a cache TAG error or a cache data error.

18. The method of claim 14, wherein detecting an error in the first processor further comprises detecting a first error in the first processor and a second error in the second processor at the same time, and further comprising determining which of the first error or the second error to process.

* * * * *